US012731028B2

(12) United States Patent
Onoro Rubio

(10) Patent No.: US 12,731,028 B2
(45) Date of Patent: Sep. 8, 2026

(54) AUTOMATIC OPTIMIZATION WITH UNCERTAINTY AWARE NEURAL NETWORKS

(71) Applicant: NEC Laboratories Europe GmbH, Heidelberg (DE)

(72) Inventor: Daniel Onoro Rubio, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 979 days.

(21) Appl. No.: 18/052,588

(22) Filed: Nov. 4, 2022

(65) Prior Publication Data

US 2024/0070452 A1 Feb. 29, 2024

Related U.S. Application Data

(60) Provisional application No. 63/401,723, filed on Aug. 29, 2022.

(51) Int. Cl.
*G16B 40/20* (2019.01)
*G06N 3/04* (2023.01)
*G06N 3/08* (2023.01)

(52) U.S. Cl.
CPC .................................... *G06N 3/08* (2013.01)

(58) Field of Classification Search
CPC ........... G06N 3/08; G06N 3/084; G06N 3/045
See application file for complete search history.

(56) References Cited

U.S. PATENT DOCUMENTS

2018/0307986 A1* 10/2018 Kabul ..................... G06N 3/09
2020/0027012 A1 1/2020 Adams et al.
2021/0004727 A1* 1/2021 Bin Awang Pon ... G06F 18/217
2021/0304847 A1* 9/2021 Senior .................. G06N 3/0464
2022/0108262 A1* 4/2022 Cella ...................... G05B 17/02
2023/0409673 A1* 12/2023 Hariharan ................ G06N 3/02

OTHER PUBLICATIONS

Iqbal, MD Shahriar et al.; "Unicorn: Reasoning about Configurable System Performance through the Lens of Causality"; *EuroSys '22 Conference,* Apr. 5-8, 2022, Rennes, France; Mar. 17, 2022; pp. 1-25; vol. 2; ISBN 978-1-4503-9162; ArXiv.org, Cornell University; Ithaca, NY, USA.

Haese, Florian et al.; "Phoenics: A Bayesian Optimizer for Chemistry"; *ACS Central Science;* Aug. 24, 2018; pp. 1134-1145; vol. 4, No. 9; American Chemical Society Publications; Washington D.C., USA.

* cited by examiner

*Primary Examiner* — Maroun P Kanaan
(74) *Attorney, Agent, or Firm* — Leydig, Voit & Mayer, Ltd.

(57) ABSTRACT

A method for automatic optimization of a system includes randomly generating a plurality of input parameter configurations for the system. Using a trained neural network, a plurality of throughputs of the system are simulated using each of the randomly generated input parameter configurations. Each of the randomly generated input parameter configurations are scored based on the simulated throughputs and data stored in a training database. An input parameter configuration is selected from the randomly generated plurality of input parameter configurations based on the scoring. The selected input parameter configuration is sent to an actuator for executing the system using the selected input parameter configuration. The method can be applied to various use cases in artificial intelligence (AI) and machine learning (ML), such as in medical/healthcare to optimize system performance or support decision making.

16 Claims, 5 Drawing Sheets

AUTOMATIC OPTIMIZATION WITH UNCERTAINTY AWARE NEURAL NETWORKS

CROSS-REFERENCE TO PRIOR APPLICATION

Priority is claimed to U.S. Patent Application No. 63/401,723, filed on Aug. 29, 2022, the entire disclosure of which is hereby incorporated by reference herein.

FIELD

The present invention relates to artificial intelligence (AI) and machine learning, and in particular to a method, system and computer-readable medium for an uncertainty aware neural network, training models thereof, and using the uncertainty aware neural network for optimization.

BACKGROUND

There are various optimization problems which apply AI methods to determine solutions. For example, Md Shahriar Iqbal, et al., "Unicorn: Reasoning about Configurable System Performance through the Lens of Causality," EuroSys '22, Rennes, France (Apr. 5-8, 2022), hereinafter referred to as "Iqbal" and incorporated by reference herein, describe an operating system optimization problem for an operating system, such as Linux, in which parameters are attempted to be optimized to increase throughput, reduce boot time and/or energy consumption, etc. Florian Haese, et al., "Phoenics: A Bayesian Optimizer for Chemistry," ACS Cent. Sci., 4(9):1134-1145 (Sep. 26, 2018), hereinafter referred to as "Haese" and incorporated by reference herein, describe a chemical compound optimization problem which considers chemical components for maximizing or minimizing certain properties, such as the melting point of a particular chemical compound.

There are multiple approaches that are typically used to solve such optimization problems, such as:

- Grid search: This approach guarantees to find the optimal solution, however the search space is typically huge which makes the exploration unfeasible, and the performance poor.
- Random search: This approach consists of randomly trying configurations. Despite seeming to be a weak approach due to its simplicity, it performs well on large exploration spaces, but is computationally burdensome.
- Bayesian optimization: This approach uses a type of algorithm that approximates the system behavior by a surrogate model (typically a Gaussian Process), then it uses an acquisition function to select what is the next configuration to try (see US 2020/0027012 A1, which is incorporated by reference herein).

SUMMARY

In an embodiment, the present invention provides a method for automatic optimization of a system. A plurality of input parameter configurations for the system are randomly generated. Using a trained neural network, a plurality of throughputs of the system are simulated using each of the randomly generated input parameter configurations. Each of the randomly generated input parameter configurations are scored based on the simulated throughputs and data stored in a training database. An input parameter configuration is selected from the randomly generated plurality of input parameter configurations based on the scoring. The selected input parameter configuration is sent to an actuator for executing the system using the selected input parameter configuration. The method can be applied to various use cases in artificial intelligence (AI) and machine learning (ML), such as in medical/healthcare to optimize system performance or support decision making.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
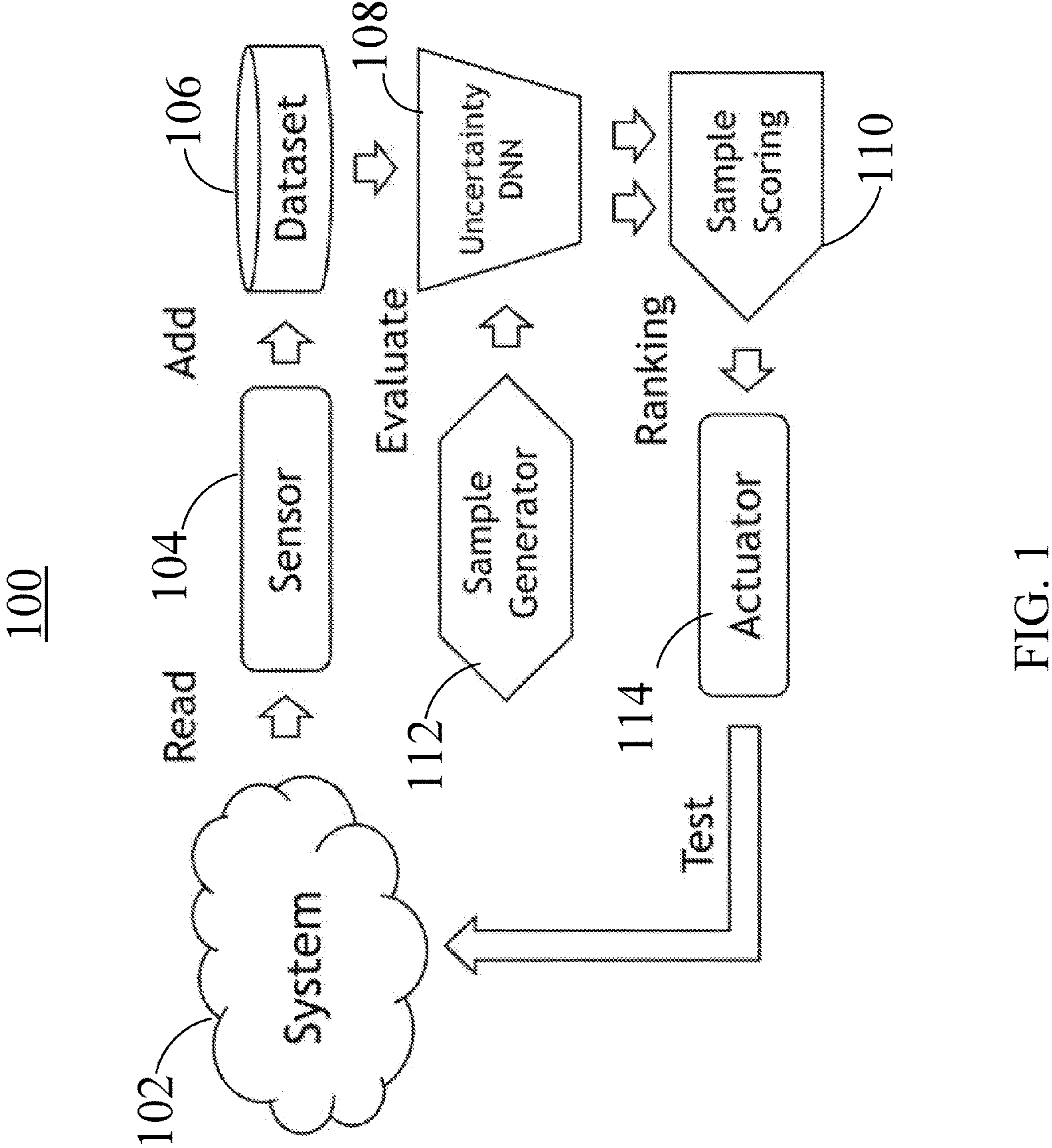
FIG. 1 illustrates a diagram of the optimization framework and workflow according to an embodiment of the present invention.

Embodiments of the present invention provide an improved general purpose machine learning framework for solving optimization problems that uses a new uncertainty aware neural network design that allows to rank, in a smart and automated fashion, new configurations to be tested in order to maximize the provability of optimizing the system (or another target intended to be optimized, such as a material). As used herein, the term "system" in the context of a system to be optimized includes any optimization target of a machine learning system, such as a material or chemical compound, the term "throughput" refers to performance of the "system." In the case of an operating system, the throughput may be determined by measuring the number of requests that the operating system may be able to handle per second, or the power consumption of the operating system, or both. The operating system is optimized by optimizing the throughput of the operating system. In the case of a material or chemical compound, the throughput may be determined by measuring how long it takes to create a compound, or the quantity of raw materials are needed, or the temperature at which the chemical compound or material is created, to name a few examples. In such embodiments, chemical properties (such as elongation, melting point etc.) are optimized by modifying chemical compounds or the production process of these materials. The term "actuator" refers to the part of the "system" that determines what parameters are supplied to the "system" for execution, and can include a human in some embodiments. In some embodiments, the actuator may provide a set of operational parameters that are determined from a machine learning model, to the operating system when it is executed that may affect its throughput, to detect the ideal configuration of the operating system. Similarly, the actuator may tweak the method of production of chemical compound or material in order to optimize a single preferred property (e.g., elongation, melting point, boiling point etc.).

Embodiments of the present invention can be especially advantageously applied to any system that has a large number of input parameters that control the operation of the system. For such a system to function efficiently, the system should be provided with the optimal value for each of the input parameters. When optimizing input parameters of various aspects of a system, it is required to keep track of a large number of variables and keep trying various permutations of different values of the variables to arrive at the ideal solution. This not only consumes valuable computation time and computational resources, but is also only possible using a system that is capable of analyzing the various parameters for optimizing a system simultaneously. Further, existing methods which attempt to optimize the input parameters are not scalable, have low accuracy, and cannot be updated easily. In contrast, embodiments of the present invention provide automated methods of system optimization that are scalable, save memory, and reduce computation time. Performance of embodiments of the present invention is not compromised with discrete variables and non-smooth functions, and embodiments of the present invention also allow incremental updates on each iteration. Embodiments of the present invention improve on the scalability and accuracy of existing neural networks by providing an estimation of accuracy of its predicted values.

Embodiments of the present invention can be especially advantageously applied for the optimization of a system in which performance of the system depends on a non-trivial combinations of its parameters, such as the operating system optimization problem or the chemical compound optimization problem. The machine learning frameworks to which embodiments of the present invention can be applied to technically improve their performance run on computers which are specially programmed to automatically make predictions for the system to be optimized using the respective input parameters. Embodiments of the present invention improve the functioning of these computers to allow them to scale to larger numbers of parameters, while reducing computation time and conserving computational resources and improving or maintaining accuracy. Moreover, embodiments of the present invention allow for easier updates, which also improve the computer's performance also in training phases, by avoiding full retrainings which consume valuable computational time and resources.

Embodiments of the present invention can especially advantageously applied to machine learning frameworks which use Bayesian optimization algorithms. In particular, embodiments of the present invention provide a new uncertainty aware neural network that improves configuration ranking. One of the core components of the typical Bayesian optimization algorithms are the Gaussian process, which is a well-known machine learning algorithm that has the property of giving predictions together with the estimated uncertainty of each prediction. However, the Gaussian process has some limitations that bounds its real utility, in particular:

- Lack of scalability: The complexity of the algorithm is $O(n^3)$, which makes the algorithm unfit even for middle size problems.
- Low performance: The algorithm does not perform well with categorical variables, or structured variables, which leads to low accuracy.
- Not easily updated: The model is not easy to update, this means that every new data point that is acquired cannot be added to the model without a full retraining.

Neural networks that are constant can scale better. In constant neural networks, the complexity of the model is a constant that is set with the model design, and is therefore independent to the size of the training data. The performance of the model is typically high, and can work well on continuous, and categorical data. Therefore, neural networks are the state of the art for multiple machine learning problems. The model can be early update to make accurate predictions on new data points just by adding them to the training set, and training it for a few iteration. The main downside of a typical neural network is the uncertainty estimation. Typical neural networks are overconfident, and unable to give a measurement of the confidence of its predictions. However, the uncertainty aware neural network according to embodiments of the present invention solves these technical deficiencies and problems.

Iqbal proposes a method for automatically optimizing and detecting bottle necks on systems. The method is based on causal discovery to find a direct graph that explains the performance of the system. This type of method has strong limitations. Graph discovery algorithms are non-deterministic polynomial-time (NP) hard problems in which its complexity and memory explodes with the number of parameters of the problem to solve, and the number of samples that are collected. This makes this type of method unsuitable for problems applicable for certain applications such as the Linux kernel optimization in which the number of parameters is over four hundred.

Haese proposes a Bayesian optimization with a Bayesian neural network as the main prediction back bone. Bayesian neural networks replace the weights of each neuron by a distribution (typically Gaussian) that are sampled at test time. The problem is that the assumption that the weights of a particular neuron will follow a Gaussian distribution is rather strong, and this can lead to performance drops of the resulting model. Moreover, the inference is done by sampling the weights from the learning distribution, which requires to sample a large number of weights, compute the estimated value, and average it. At the same time, the uncertainty of the network corresponds to the standard derivation of the predictions that were made. This type of model is significantly slower and more computationally burdensome since they have to be evaluated multiple times and since each parameter needs to be replaced by a mean and the variance.

US 2020/0027012 A1 proposes a generic Bayesian optimization algorithm and describes features relating to the side of the acquisition function (or scoring function). In particular, a special acquisition function, and mechanism that allows to suggest multiple configurations to try at once, are proposed, but they do not fix or introduce any improvement on the surrogate model, and heavily rely on Gaussian processes, which suffer from the technical problems discussed above.

Embodiments of the present invention provide a method to perform automatic system optimization. Embodiments of the present invention provide solutions to the main technical limitations of the automatic system optimization approach based on Bayesian optimization with Gaussian processes which are: the lack of scalability (in contrast, embodiments of the present invention are scalable save memory, and reduce computation time), low accuracy (in contrast, performance of embodiments of the present invention is not compromised with discrete variables and non-smooth functions), and the difficulty to update the model (in contrast, embodiments of the present invention allows incremental updates on each iteration (Gaussian processes need a complete retraining)).

According to a first aspect, the present disclosure provides a method for automatic optimization of a system. A plurality of input parameter configurations for the system are randomly generated. Using a trained neural network, a plurality of throughputs of the system are simulated using each of the randomly generated input parameter configurations. Each of the randomly generated input parameter configurations are scored based on the simulated throughputs and data stored in a training database. An input parameter configuration is selected from the randomly generated plurality of input parameter configurations based on the scoring. The selected input parameter configuration is sent to an actuator for executing the system using the selected input parameter configuration.

According to a second aspect, the method according to the first aspect measures a throughput of the system executed using the selected input parameter configuration.

According to a third aspect, the method according to the first or the second aspect further comprises storing the measured throughput of the system and the selected input parameter configuration in the training database.

According to a fourth aspect, the method according to any of the first to the third aspects further comprises using the data stored in the training database to train the neural network.

According to a fifth aspect, the method according to any of the first to the fourth aspects further comprises that the neural network further comprises a prediction branch that simulates the throughput of the system using a parameter configuration from the randomly generated input parameter configurations, and an uncertainty branch that determines a confidence level of the simulated throughput of the system using the parameter configuration from the randomly generated input parameter configurations.

According to a sixth aspect, the method according to any of the first to the fifth aspects further comprises that the uncertainty branch of the neural network estimates an error associated with each of the simulated throughputs.

According to a seventh aspect, the method according to any of the first to the sixth aspects further comprises that the error associated with each of the simulated throughputs is estimated by comparing the simulated throughputs to data stored in the training database.

According to an eighth aspect, the method according the any of first to the seventh aspects further comprises that training the neural network comprises reducing the estimated error associated with each of the simulated throughputs, and reducing losses associated with the prediction branch of the neural network.

According to a ninth aspect, the method according to any of the first to the eighth aspects further comprises that the scoring of the randomly generated input parameter configurations is based on the simulated throughputs and the estimated error associated with each of the simulated throughputs.

According to a tenth aspect, the method according to any of the first to the ninth aspects further comprises that the system is a physical system interacted in a wet lab or a chemical facility, and wherein the input parameter configurations include a configuration of a plurality of components that are part of a chemical reaction.

According to an eleventh aspect, the method according any of to the first to the tenth aspects further comprises that the system is an operating system, and wherein the input parameter configurations include a configuration of one or more of the following parameters of the operating system: worker_connections, payload_size, keepalive_timeout, open_file_cache, num_parallel_connections, tcp_nopush of the operating system.

According to a twelfth aspect, the method according to any of the first to the eleventh aspects further comprises that the throughput of the operating system is based on a number of requests per second handled by the operating system and power consumption of the operating system.

According to a thirteenth aspect, the method according to any of the first to the twelfth aspects further comprises that scoring each of the randomly generated input parameter configurations further comprises computing a weighted combination of probability improvement and a minimal distance between a sampled point and training data.

According to a fourteenth aspect of the present disclosure, a computer system programmed for automatic optimization of a system is provided, the computer system comprising one or more hardware processors configured by code stored in memory to provide for execution of the following steps: randomly generating a plurality of input parameter configurations for the system; simulating, using a trained neural network, a plurality of throughputs of the system using each of the randomly generated input parameter configurations; scoring each of the randomly generated input parameter configurations based on the simulated throughputs and data stored in a training database; selecting an input parameter configuration from the randomly generated plurality of input parameter configurations based on the scoring; and sending the selected input parameter configuration to an actuator for executing the system using the selected input parameter configuration.

A fifteenth aspect of the present disclosure provides a tangible, non-transitory computer-readable medium having instructions thereon, which, upon being executed by one or more processors, provides for execution of the method according to any of the first to the thirteenth aspects.

FIG. 1 shows an overview of the optimization framework 100, according to an embodiment of the present invention. FIG. 1 also depicts a workflow interaction between different parts of the optimization framework 100 to optimize system 102. System 102 can be a physical or a virtual system, according to an embodiment of the present invention. The performance of system 102 depends on a plurality of inputs that can be controlled. Sensors 104 and dataset 106 are part of a data acquisition module of the optimization framework 100. The data acquisition module measures the performance of the system 102, using sensors 104, and stores the measured performance in a dataset 106. In some examples, the data stored in the dataset 106 is known as the training data.

In some embodiments, uncertainty deep neural network (DNN) 108 of optimization framework 100 is capable of estimating the performance of system 102 for a generated configuration of input parameters. In such embodiments, the sample generator 112 generates a plurality of random configurations that that the system 102 can take as input. In such examples, these configurations are provided as input to the uncertainty DNN 108 and a performance of system 102 corresponding to each of the plurality of randomly generated configurations is estimated. Uncertainty DNN 108 includes a non-trivial neural network design that extends an arbitrary machine learning technique such as a neural network to provide a predicted value, and an estimation of error associated with the predicted value. Further details will be explained later with reference to FIG. 2. The estimated performance of system 102 corresponding to each of the plurality of randomly generated configurations is then evaluated for accuracy. Uncertainty DNN 108 also generates an estimated error for each estimated performance of system 102 that corresponds to a randomly generated configuration generated by sample generator 112.

The training data from dataset 106, the estimations of performance of system 102 corresponding to a plurality of randomly generated configurations generated by uncertainty DNN 108, the plurality of random configurations generated by sample generator 112, and the estimated error generated by uncertainty DNN 108 are scored by sample scoring 110. Sample scoring 110 ranks the plurality of randomly generated configurations based on the inputs provided. Sample scoring 110 ranks each of the randomly generated configurations using a scoring system that is based on an evaluation of the random configurations estimated performance on system 102 and the error in the estimated performance values compared to the training data. In some embodiments, the randomly generated configurations that provide a higher performance of system 102, but also a larger error, are to be ranked higher.

In some embodiments, the sample scoring 110 uses Expected Improvement (EI), which is the most popular in Bayesian Optimization. In some embodiments, the sample scoring 110 may use Probability Improvement (PI). In some other embodiments, sample scoring 110 may use a weighted combination of PI and the minimal distance between the sampled point and the training data. In some embodiments, the ranking is generated by sample scoring 110 using the following formulae:

$$\text{Score} = \text{Probability Improvement} + \alpha \times disim_{sim}$$

$$disim_{sim} = 1 - \max(disum, \text{axis} = -1)$$

$$disum = \frac{1.0}{1 + \text{distance}(X_{sampled}, X_{train})}$$

Sample scoring 110 provides the randomly generated configurations with the highest score to actuator 114. In some embodiments, the sample scoring 110 may provide a predetermined number of randomly generated configurations to the actuator 114. For example, the sample scoring 110 may send the two highest ranked configurations to actuator 114. The actuator 114 is configured to interact with the system 102. In some examples, the actuator 114 provides the configurations from the plurality of randomly generated configurations that are ranked highest by sample scoring 110 to the system 102. The performance of the configurations provided to the system 102 by actuator 114 are measured by sensors 104 and the data corresponding to the measurements is stored in dataset 106.

Figure 2:
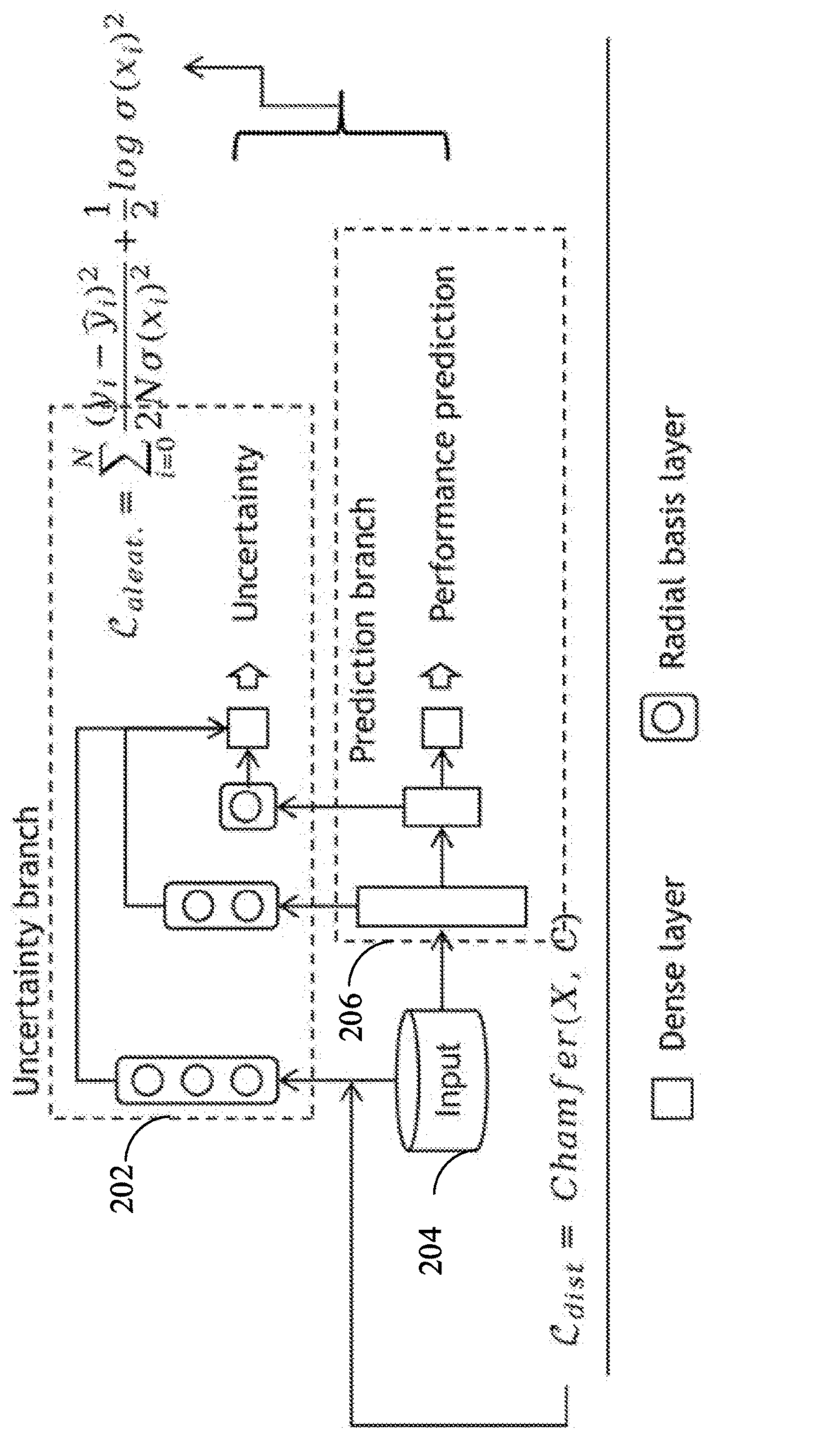
FIG. 2 illustrates a diagram of the machine learning model according to an embodiment of the present invention.

FIG. 2 illustrates a diagram of the machine learning model according to an embodiment of the present invention. In some embodiments, the machine learning model 200, depicted in FIG. 2, is used as part of the uncertainty DNN 108 described in FIG. 1. As described with respect to FIG. 1, the uncertainty DNN 108 estimates a performance of system 102 based on a plurality of random configurations used as input, and determines an error associated with each estimation. A first branch of this machine learning model 200 is a prediction branch 206 that estimates the performance of the system 102 for a configuration from a plurality of randomly generated configurations by sample generator 112. A second branch of the machine learning model 200 is an uncertainty branch 202 that predicts the estimated error for the estimated performance of the system 102.

In some embodiments, the machine learning network 200 of FIG. 2 is a deep neural network with the capability to simultaneously predict the target and the estimated error in one shot (without the need for Monte Carlo sampling). The proposed model contains two branches that run in parallel: the uncertainty branch 202 and the prediction branch 206. The uncertainty branch is a neural network made of Radial Basis Function layers (RBFl):

$$\text{RBFl}(x|C) = e^{-\gamma\|x-B\|}$$

where $x \in \mathbb{R}^d$ corresponds to the input vector with d dimensions, $C \in \mathbb{R}^{(k,d)}$ is the matrix that contains the k centroids of the layer, and $\gamma$ is the smoothness parameter of the layer. The response of each neuron gets higher with the inverse of the distance between the input and the response. This causes that outlayers (i.e., data points far away from the centroids) have a low activation. These layers get two signals during the training, one that fits the input data distribution, and the other that minimizes the error or the predicted uncertainty. By minimizing $\mathcal{L}_{dist}$ the centroids are learned to fit the training data by reducing the Chamfer distance. In some embodiments, the Chamfer distance could be replaced by other losses that can push the centroid towards the input, for example, a k-means algorithm could be used for this end. However, the Chamfer loss is differentiable, so it can be easily incorporated to the training by adding it to other losses. $\mathcal{L}_{aleat.}$ minimizes the mean square error of the prediction branch at the time that fits the estimated uncertainty. The responses of all the radial basis layers are aggregated (for example, by concatenating them), and they are the input of a dense layer, which will predict the estimated error. For the prediction branch, a conventional neural network can be used and/or any machine learning model for regression. The model is trained by minimizing both $\mathcal{L}_{dist}$ and $\mathcal{L}_{aleat.}$ The method according to an embodiment is an iterative approach. The method automatically chooses the next configuration to try, and after a number of iterations (typically a small number), or other stop criterion, the algorithm offers the best configuration found. Algorithm 1 shows a pseudocode of the running cycle of an embodiment of the method.

Algorithm 1: pseudocode that illustrates the main functions to iteratively optimize a system.

```
Inputs: n_it
Output: best_config
n2_gen = 1000 # Constant to be set
best_config <- random_config(1)
y <- eval(best_config)
data <- add(best_config, y)
for it in n_it:
    model.update(data)
    config_set <- random_config(n2_gen )
    scores <- score(config_set, model, data)
```

As is evident from Algorithm 1, the method iteratively optimizes the operation of a system. The system takes a plurality of input parameters to function. In order for the system to function smoothly, the method optimizes the parameters of operation of the system. A plurality of configurations are randomly generated. An estimation of the throughput of the system using the each of the plurality of randomly generated configurations is computed. The randomly generated configurations are then evaluated based on the estimation of throughput of the system, the randomly generated configuration, and an estimated error of the estimated throughput. The configuration that has the highest estimated throughput is selected and provided to the system.

In an embodiment, the system 102 of FIG. 1, that is optimized using the machine learning algorithm 200 is an operating system. Operating systems are difficult to optimize as they typically contain tens to hundreds of configurable parameters that need to be configured in order to get an optimal performance. These parameters create a huge optimization space which makes the sequential search infeasible, and the interconnection and correlations between parameters makes the optimization non-trivial even for human operators.

Figure 3:
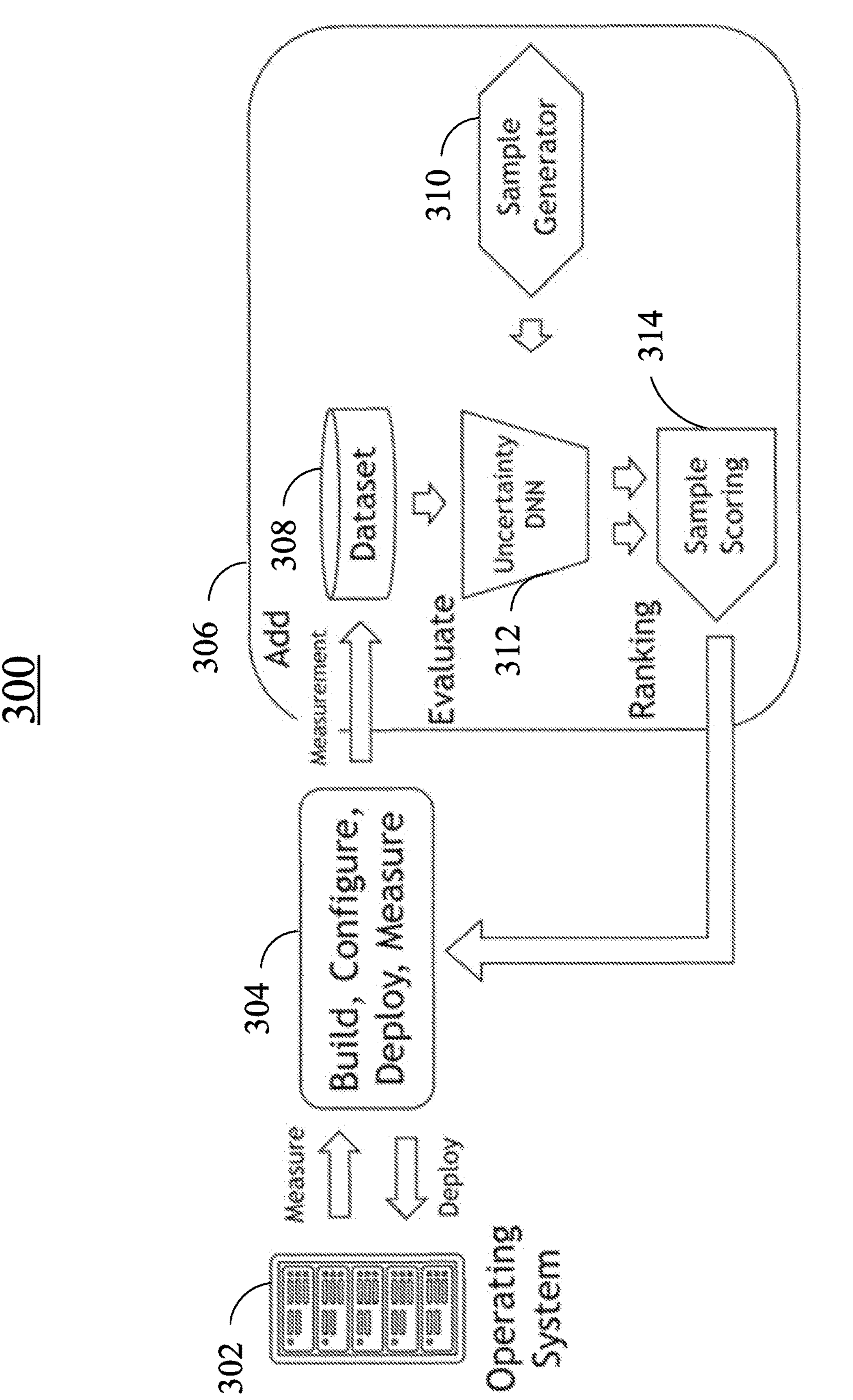
FIG. 3 illustrates a method for automatic operating system optimization according to an embodiment of the present invention.

FIG. 3 shows an embodiment of the present invention for the operating system optimization. In an embodiment, the configurable parameters of operating system 302 are optimized for better performance. Some exemplary configurations of an operating system 320 that may be optimized are displayed in Table 1 below:

TABLE 1

| | Throughput | Perm_ID | WORKER_CONNECTIONS | PAYLOAD_SIZE | KEEPALIVE_TIMEOUT | OPEN_FILE_CACHE |
|---|---|---|---|---|---|---|
| 0 | 12482.8 | 173995 | 63 | 612 | 30 | No caching |
| 1 | 15948.96 | 174006 | 63 | 612 | 60 | No caching |
| 2 | 16491.19 | 174059 | 63 | 612 | 60 | caching |
| 3 | −1 | 174048 | 63 | 612 | 30 | No caching |
| 4 | 15855.67 | 173998 | 63 | 612 | 300 | caching |

| | NUM_PARALLEL_CONNS | TCP_NOPUSH | SERVER_TOKENS | WORKER_RLIMIT_NOFILE | SES_EN | TO |
|---|---|---|---|---|---|---|
| 0 | 30 | On | Off | 126 | 0 | 0 |
| 1 | 30 | On | Off | 63 | 0 | 0 |
| 2 | 30 | Off | On | 126 | 0 | 0 |
| 3 | 30 | On | On | 126 | 1 | 1 |
| 4 | 30 | Off | Off | 63 | 0 | 1 |

In some examples, the operating system 302 is a Linux system. Operating system 302 is connected to an interface 304 that deploys the operating system 302 with a selected configuration, and measures the throughput of the operating system 302 based on the selected configuration. In some embodiments, the throughput of an operating system is measured by the number of request per second that the operating system is able to handle. In some other embodiments, the throughput of the operating system is measured based on the power consumption of the operating system. In some embodiments, the throughput of the operating system is measured based on a ratio of the number of requests per second and power consumption of the operating system.

The measured throughput of the operating system 302 is sent to optimizing framework 306. Optimizing framework 306 is similar to the optimizing framework 100 described in FIG. 1. In optimizing framework 306, the measured throughput of operating system 302 is stored in dataset 308. The sample generator 310 generates a plurality of random configurations for operation of the operating system 302 and each of the randomly generated configurations are provided to uncertainty DNN 312. As described in FIG. 1, uncertainty DNN 312 estimates a performance of operating system 302 based on a plurality of random configurations generated by sample generator 310, and estimates an error associated with each estimation. Each set of error estimation, performance estimation, and the configuration associated with this measurement is sent to sample scoring 314 for scoring. The generated configurations with the highest score from sample scoring 314 are sent to interface 304. Interface 304 deploys the configurations with the highest score in operating system 302. In some examples, the interface 304 may be a OS performance evaluator (e.g., Wayfinder). The performance of the operating system using the generated configuration is measured by interface 304, and that data is stored in dataset 306. This process is iterative and is repeated multiple times until the ideal configuration of operating parameters for the operating system is achieved. In some embodiments, a user may configure the iterative process to end after a fixed number of iterations (e.g., 500). In some other embodiments, the user may configure the iterative process to end after a fixed time period (e.g., 8 hours).

In another embodiment, the method is practically applied for material optimization. The method provides for additional technical improvements in this technical field in that wet-lab experiments are costly and time consuming experiments. Therefore, it is recognized according to an embodiment that the material industry is in need of solutions in the material informatics to optimize the material design, and reduce costs and time on the wet-lab. Embodiments of the present invention can be used to optimize certain properties of a given material by finding optimal parameters for its synthesis, structure, or other properties.

Figure 4:
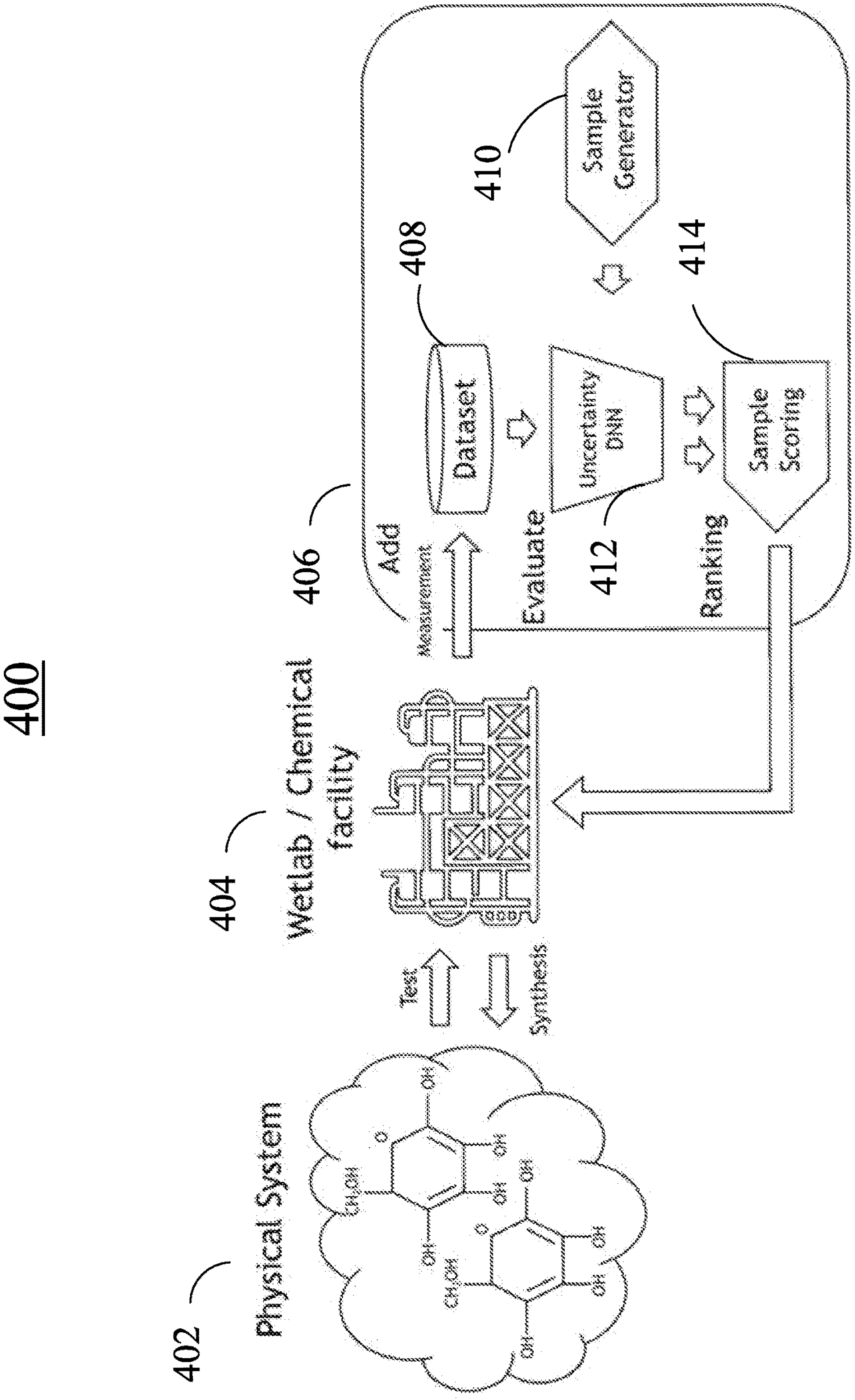
FIG. 4 illustrates an example of material optimization according to an embodiment of the present invention.

FIG. 4 is a diagram that illustrates an embodiment of the present invention for material optimization. For example, the method can be applied for a material that has thermal properties, such as the melting point, which depend on some of the parameters that are used for its synthesis such as the concentration of certain chemicals, catalysts, etc. These are parameters that can be optimized according to embodiments of the present invention. In some embodiments, the throughput of a system for material optimization is a chemical property that is to be optimized. For example, the material optimization system may optimize the hardness of a glass, by changing the annealing parameters such as time, temperature, humidity. The same method may be employed when dealing with plastics. In either case, the system of material optimization may recommend changes to the manufacturing process of glass or plastics to optimize selected parameters. In the example of FIG. 4, the representations of the chemical system 402 are first determined using interface 404. In some embodiments, the representations of the system are measured and interacted with in a wet-lab or a chemical facility.

The measured representation of the system 402 is sent to optimizing framework 406. Optimizing framework 406 is similar to the optimizing framework 100 described in FIG. 1. In optimizing framework 406, the measured representation of chemical system 402 is stored in dataset 408. The sample generator 410 generates a plurality of random configurations for chemical system 402 and each of the randomly generated configurations are provided to uncertainty DNN 412. As described in FIG. 1, uncertainty DNN 412 estimates a performance of chemical system 402 based on a plurality of random configurations generated by sample generator 410, and estimates an error associated with each estimation. Each set of error estimation, performance estimation, and the configuration associated with this measurement is sent to sample scoring 414 for scoring. The generated configurations with the highest score from sample scoring 414 are sent to interface 404. Interface 404 deploys the configurations with the highest score in chemical system 402. The performance of the operating system using the generated configuration is measured by interface 404, and that data is stored in dataset 406. This process is iterative and is repeated multiple times until the ideal configuration of operating parameters for the chemical system are achieved.

Embodiments of the present invention enable the following advantages and improvements:

1) Providing a system optimization framework based on neural networks that can provide accurate predictions and accurate uncertainty estimations. This provides for the following additional technical improvements:
   a. Increased scalability,
   b. Higher performance on the estimations,
   c. Faster algorithm speed,
   d. Easier model updates.
2) Providing a new neural network design that:
   a. Has two branches: prediction and uncertainty.
   b. The uncertainty branch with RBF layers, which are trained to fit the data distribution, and the predicted uncertainly.
   c. The training of the model by simultaneity minimizing the proposed losses: $\mathcal{L}_{dist}$ and $\mathcal{L}_{aleat}$.
3) Providing for improved system performance on systems/optimization targets with categorical and continuous parameters.
4) Providing for increased scalability of the algorithm (going from $O(n^3)$ to $O(n)$).
5) Providing a neural network design that provides an accurate error estimation in a single shot (without Monte Carlo sampling or other techniques).

In an embodiment, the present invention provides a method for automatic system optimization, the method comprising the steps of:

1) Measure the throughput of the system for a known parameter configuration with a sensor or other device or mechanism (see FIG. 1, sensors 104).
2) Create a training database that holds the throughput of the system and the permutation/configuration that leads to that (see FIG. 1, dataset 106).
3) Train/update the model as in FIG. 2 with the training data.
4) Generate random permutations or configurations (see FIG. 1, sample generator 112).
5) Simulate the performance of the randomly generated permutations with the model (see FIG. 1, Uncertainty DNN 108) together with the training data.
6) Score the randomly generated permutations with respect to the training data (see FIG. 1, Uncertainty DNN 108).
7) Pick the configuration with the highest score and send it to an actuator (see FIG. 1, Actuator 114). The actuator will modify the system to run with the given parameters.

Figure 5:
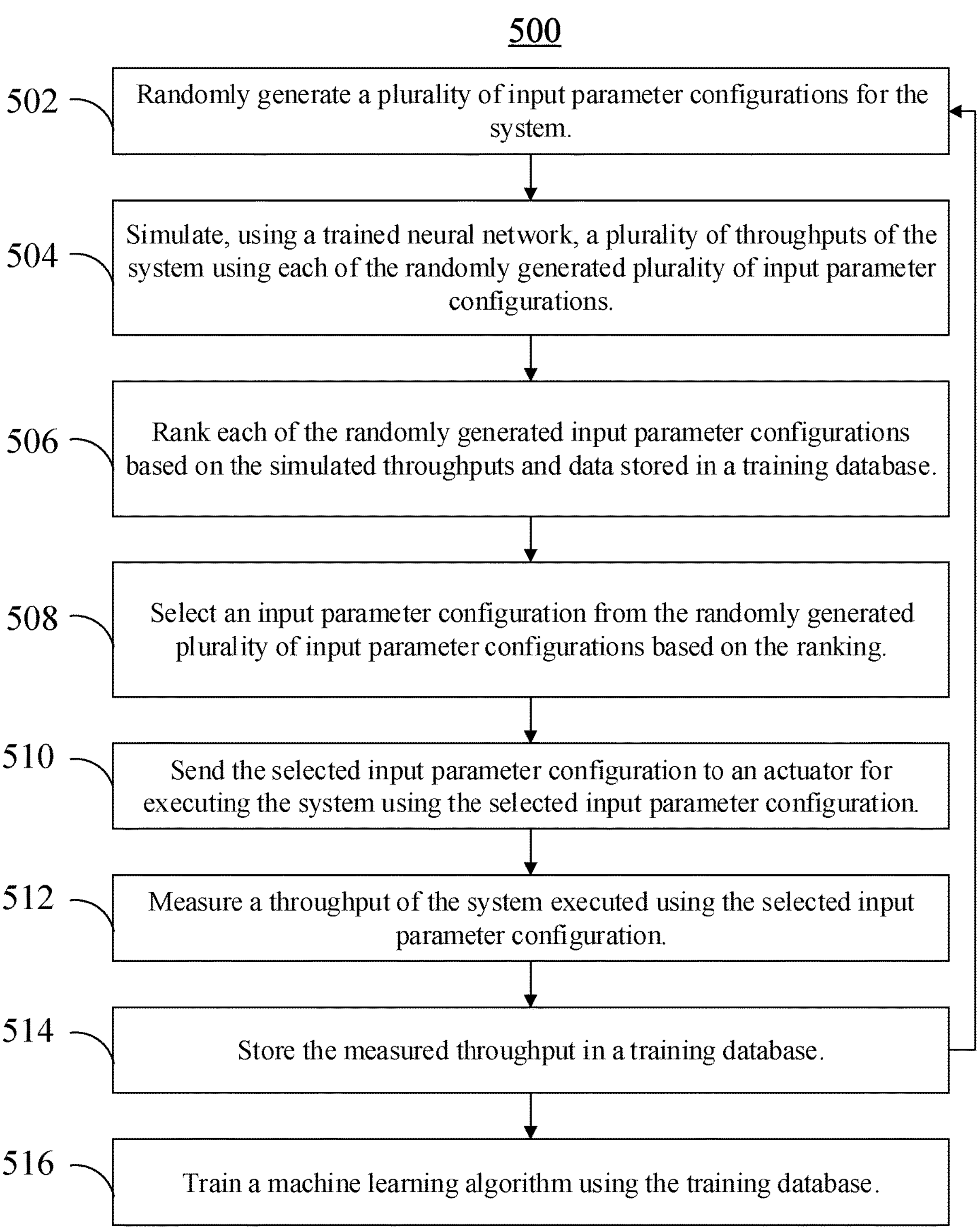
FIG. 5 illustrates an exemplary flowchart for optimizing a system according to an embodiment of the present invention.

FIG. 5 illustrates an exemplary flowchart for optimizing a system according to an embodiment of the present invention. The flowchart resembles the workflow depicted in FIG. 1. In some examples, the system takes a plurality of input parameters to function, and the optimal functioning of the system may be achieved by optimizing the input parameters. It will be recognized that any of the following blocks may be performed in any suitable order and that the process 500 may be performed in any environment and by any suitable computing device and/or controller.

At step 502, a plurality of input parameter configurations for the system are randomly generated.

At step 504, a throughput of the system is simulated, using a trained neural network, using each of the randomly generated plurality of input parameter configurations.

At step 506, each of the randomly generated input configurations are ranked using the simulated throughputs and data stored in a training database.

At step 508, an input parameter configuration from the randomly generated plurality of input parameter configurations is selected. The input parameter configurations are selected based on the ranking generated for each of the randomly generated plurality of configurations.

At step 510, the selected input parameter configuration is sent to an actuator for executing the system using the selected input parameter configuration.

At step 512, a throughput of the system is measured, when the system is executed with the selected input parameter configuration.

At step 514, the measured throughput of the system is stored in the training database. The optimization of the parameters is an iterative process. And blocks 502-514 may be repeated until the ideal parameter configurations are achieved. The selected parameter configurations from the randomly generated plurality of input parameter configurations are added to the training database to train the neural network.

At step 516, the data from the training database is used to train the neural network algorithm. The training of the machine learning algorithm assists in improvement in estimation of the plurality of throughputs associated with each of a plurality of randomly generated configurations for the system.

Embodiments of the present invention can be advantageously applied to regression problems (continuous values) to provide improvements to various technical fields such as operation system design and optimization, material design and optimization, telecommunication network design and optimization, etc. Compared to existing approaches, embodiments of the present invention minimize uncertainty, while increasing performance and accuracy, providing for faster computation and saving computational resources and memory. For example, according to embodiments of the present invention, outliers with low uncertainty can be avoided while the latency and/or memory consumption is linear or constant.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automatic optimization of a system, the method comprising:

randomly generating a plurality of input parameter configurations for the system;

simulating, using a trained neural network, a plurality of throughputs of the system using each of the randomly generated input parameter configurations;

scoring each of the randomly generated input parameter configurations based on the simulated throughputs and data stored in a training database;

selecting an input parameter configuration from the randomly generated plurality of input parameter configurations based on the scoring; and sending the selected input parameter configuration to an actuator for executing the system using the selected input parameter configuration.

2. The method of claim 1, further comprising measuring a throughput of the system executed using the selected input parameter configuration.

3. The method of claim 2, wherein the measured throughput of the system and the selected input parameter configuration are stored in the training database.

4. The method of claim 3, wherein the data stored in the training database is used to train the neural network.

5. The method of claim 4, wherein the neural network further comprises:

a prediction branch that simulates the throughput of the system using a parameter configuration from the randomly generated input parameter configurations; and an uncertainty branch that determines a confidence level of the simulated throughput of the system using the parameter configuration from the randomly generated input parameter configurations.

6. The method of claim 5, wherein the uncertainty branch of the neural network estimates an error associated with each of the simulated throughputs.

7. The method of claim 6, wherein the error associated with each of the simulated throughputs is estimated by comparing the simulated throughputs to data stored in the training database.

8. The method of claim 7, wherein training the neural network comprises:

reducing the estimated error associated with each of the simulated throughputs; and reducing losses associated with the prediction branch of the neural network.

9. The method of claim 7, wherein the scoring of the randomly generated input parameter configurations is based on the simulated throughputs and the estimated error associated with each of the simulated throughputs.

10. The method of claim 1, wherein the system is a physical system interacted in a wet lab or a chemical facility, and wherein the input parameter configurations include a configuration of a plurality of components that are part of a chemical reaction.

11. The method of claim 1, wherein the system is an operating system, and wherein the input parameter configurations include a configuration of one or more of the following parameters of the operating system: worker_connections, payload_size, keepalive_timeout, open_file_cache, num_parallel_connections, tcp_nopush.

12. The method of claim 11, wherein the throughput of the operating system is based on a number of requests per second handled by the operating system and power consumption of the operating system.

13. The method of claim 1, wherein scoring each of the randomly generated input parameter configurations further comprises computing a weighted combination of probability improvement and a minimal distance between a sampled point and training data.

14. The method of claim 1, wherein the selected input parameter has a highest score, the method further comprising executing, by the actuator, the system using the selected input parameter configuration.

15. A computer system programmed for automatic optimization of a system, the computer system comprising one or more hardware processors configured by code stored in memory to provide for execution of the following steps:

randomly generating a plurality of input parameter configurations for the system;

simulating, using a trained neural network, a plurality of throughputs of the system using each of the randomly generated input parameter configurations;

scoring each of the randomly generated input parameter configurations based on the simulated throughputs and data stored in a training database;

selecting an input parameter configuration from the randomly generated plurality of input parameter configurations based on the scoring; and sending the selected input parameter configuration to an actuator for executing the system using the selected input parameter configuration.

16. A tangible, non-transitory computer-readable medium having instructions thereon, which, upon being executed by one or more processors, provides for execution of the following steps:

randomly generating a plurality of input parameter configurations for the system;

simulating, using a trained neural network, a plurality of throughputs of the system using each of the randomly generated input parameter configurations;

scoring each of the randomly generated input parameter configurations based on the simulated throughputs and data stored in a training database;

selecting an input parameter configuration from the randomly generated plurality of input parameter configurations based on the scoring; and sending the selected input parameter configuration to an actuator for executing the system using the selected input parameter configuration.

* * * * *